United States Patent [19]

Jergenson

[11] Patent Number: 5,018,954

[45] Date of Patent: May 28, 1991

[54] SHIELDED COUNTER-ROTATING SPINNER ASSEMBLY FOR MICROPARTICALIZATION OF LIQUID

[75] Inventor: Jerg B. Jergenson, Santa Barbara, Calif.

[73] Assignee: Microparticle Technology, Inc., Santa Barbara, Calif.

[21] Appl. No.: 509,213

[22] Filed: Apr. 16, 1990

[51] Int. Cl.[5] .................... B29B 9/00

[52] U.S. Cl. .................... 425/8; 264/8; 264/82

[58] Field of Search .......... 425/8; 264/8, 12, DIG. 75, 264/82; 65/6, 8, 71; 118/730

[56] References Cited

U.S. PATENT DOCUMENTS

| | | | |
|---|---|---|---|
| 2,238,364 | 4/1941 | Hall | 261/88 |
| 2,306,449 | 12/1942 | Landgraf | 425/8 |
| 2,433,000 | 12/1947 | Manning | 264/DIG. 75 |
| 2,439,772 | 4/1948 | Gow | 264/8 |
| 3,317,954 | 5/1967 | Crompton | 65/8 |
| 3,346,356 | 10/1967 | Anderson et al. | 264/8 |
| 3,483,281 | 12/1969 | Chisolm | 425/8 |
| 3,597,176 | 8/1971 | Plumat | 264/8 |
| 3,912,799 | 10/1975 | Chisolm | 425/8 |
| 4,100,879 | 7/1978 | Goldin et al. | 118/730 |
| 4,211,736 | 7/1980 | Bradt | 264/12 |

FOREIGN PATENT DOCUMENTS

| | | | |
|---|---|---|---|
| 1195956 | 11/1959 | France | 425/8 |

*Primary Examiner*—Jay H. Woo
*Assistant Examiner*—William J. Matney, Jr.
*Attorney, Agent, or Firm*—Allen A. Dicke, Jr.

[57] ABSTRACT

The preferred embodiment of the shielded counter-rotating spinner assembly for microparticalization of liquid consists of two opposed, coaxial, counter-rotating, conical, sharp-edged spinners whose edges are in close proximity and whose outer surfaces are in close proximity with non-rotating shields which extend to the edges of the spinners. The purpose of the shields is to greatly reduce the spinner induced air drafts so that, when liquids are applied to the inside surfaces of the spinners through the axes of the driving motors, the droplets produced on the edges of the spinners are injected into very low velocity air. The benefits of accomplishing this are the realization of very short droplet trajectories, the concomitant reduction in size of a plenum chamber which might encompass the device, the production of dense fogs of liquid droplets, and the ability to efficiently mix a liquid with a gas or to mix binary liquid chemicals together away from the device, but within a restricted volume where the atmosphere may be controlled and the production of solid droplets from the liquid phase through cooling in a finite volume and within a controlled atmosphere.

13 Claims, 9 Drawing Sheets

SHIELDED COUNTER-ROTATING SPINNER ASSEMBLY FOR MICROPARTICALIZATION OF LIQUID

FIELD OF THE INVENTION

This invention pertains to the microparticalization of liquids through mechanical means-specifically, with the use of spinning discs. Here, liquid is applied to a surface of a spinner, where it wets the surface, and flows to the edge of the spinner, where it is ejected in the form of droplets. The droplets leave the spinner tangent to the spinner's edge and in the same direction as the spinner is rotating. The principal advantage of using a spinner for the production of droplets has to do with the fact that droplet size may be controlled by varying spinner speed. My research has shown that the inverse relationship between droplet size and spinner RPM can be described by the linear empirical equation:

$$\ln D = -m \ln RPM + b \qquad 1$$

Where:

m and b are experimentally determined constants which depend on spinner diameter, spinner geometry and the liquid used. I have found that the term "b" is flow sensitive. The larger the liquid flow rate, the greater is "b" and, consequently, droplet size increases somewhat.

The principal drawback of the simpler spinner is that it generates an air draft whose direction, like that of an ejected droplet, is tangent to the edge of the spinner and in the same direction as the spinner rotates. My research has yielded two linear, empirical equations which describe the tangential air draft from a single spinner. The first equation shows the direct relationship between tangential air draft velocity and spinner RPM, or:

$$V_{AT} = M \times RPM + B \qquad 2$$

Where:

M and B are experimentally determined constants which depend on spinner diameter, spinner geometry and the distance from the spinner's edge.

The second empirical equation shows the inverse relationship between the tangential air draft velocity and the tangential distance from the spinner's edge, or:

$$\ln VAT = -M' \times S_{AT} + B, \qquad 3$$

Where

M' and B' are experimentally determined constants which depend on spinner diameter, spinner geometry and the spinner RPM.

The spinner induced air draft is a disadvantage because droplets of liquid from the spinner's edge are injected directly into this co-directional air draft and carried a great distance, very much farther than if the droplets were injected into still air.

In order to appreciate how far a spherical droplet would travel when injected at high speed into still air, I had to develop a representative aerodynamic model. The theory behind the model is based on accepted aerodynamic principals and experimentally derived facts and data, namely:

A. For the most part, droplets ejected from a spinner are spherical - increasingly so as spinner speed increases (and droplet diameter decreases).

B. The initial Reynold's number for droplets leaving the edge of a spinner does not exceed 300, regardless of the initial droplet velocity (i.e. spinner edge speed).

C. I obtained real data for droplet size vs. spinner speed for a particular fluid (paint thinner) and spinner geometry.

When the Reynold's number for a sphere is less than 300, Equation 4 may be used as a close approximation of the real relationship between the aerodynamic drag coefficient of a sphere and the Reynold's number of the sphere.

$$C_D = \frac{24}{N_R} \sqrt{1 + 3/16\, N_R} \qquad \text{Equa. 4}$$

Equation 4 can be regarded as a dynamic operating curve for a droplet injected at high velocity into air. Using Equation 4, the definition of Reynold's number and the general drag equation, two formulas may be derived which show respectively the tangential velocity of a droplet versus time and the tangential distance traveled versus time. These equations may be combined to show tangential distance as a function of tangential velocity, or:

$$S_T = \frac{-2}{K_4} [\sqrt{K_3 + K_4 V_T} + \sqrt{K_3} \cdot E] \qquad \text{Equa. 5}$$

Where:

K3, K4 and E are rather complicated combinations of the droplet density, density of air, viscosity of air and the initial velocity of the droplet.

If the tangential velocity is set to zero in Equation 5, the resultant equation shows the maximum path length traveled by the droplet, or:

$$S_T \Big|_{V_T=0} = \frac{16\delta D}{27\rho} \left[ \sqrt{1 + \frac{3\rho D V_i}{16 \cdot z}} - 1 \right] \qquad \text{Equa. 6}$$

Where (using the CGS system of measurement):

$\delta$ = Density of the liquid of which the droplet is composed.

$\rho$ = Density of the atmosphere into which the droplet is injected.

$z$ = Viscosity of the atmosphere into which the droplet is injected.

D = Droplet diameter.

$V_i$ = Initial droplet velocity (a function of spinner diameter and RPM).

A single 6 inch diameter spinner, operating in air at standard pressure, rotating at 16,000 RPM and fed with paint thinner at 0.75 cc/sec, will produce 25 micron diameter droplets. If the spinner induced air draft could be reduced to zero, Equation 6 predicts that the ejected droplets would only travel a tangential distance of 5.04 cm from the spinner edge (3.28 cm radially). However, the system as described does generate an air draft which entrains the droplets. Equation 3, with the proper constants for the above-described system (e.g. M=0.089 and B=7.1882), indicates a tangential air draft of 90 cm/sec at a tangential distance of 30 cm—the velocity of an entrained droplet can be no less than this.

From what has been said, it is clear that the prior art spinner generates an air draft which entrains droplets and carries them very much farther than they would go if the spinner induced air draft could be reduced to zero.

SUMMARY OF THE INVENTION

The present invention provides a way where spinner induced air draft velocities are greatly reduced so that liquid droplets, ejected from a spinner's edge, encounter relatively still air where they decelerate rapidly and consequently travel short distances. The principal benefit of accomplishing this is that a dense fog of droplets may be produced within a relatively small volume (i.e. plenum chamber).

The preferred embodiment of the invention simultaneously employs two structures to greatly reduce spinner induced air draft velocity. It will be understood that the employment of either of the two structures separately will, in itself, reduce spinner induced air draft velocity.

The first structure employs two conical, sharp-edged, counter-rotating coaxial spinners whose edges are in very close proximity. The two spinners produce opposing, tangential air drafts which, because of the close spacing of the spinners, collide with each other very near to the edges of the two spinners. The collision results in an air draft which is purely radial in direction, but having a magnitude much less than the radial component of the tangential air draft produced by either spinner alone. A reduction in air draft velocity by as much as a factor of two is obtained by this structure alone. Furthermore, the reduction improves with spinner speed.

The second structure employs the above-described structure with the addition of two non-rotating shields which cover the exposed surfaces of the two counter-rotating spinners. The shields are placed in close proximity with the spinner surfaces and extend to the edge of each spinner. The shields prevent air from reaching the rotating surfaces and, thereby, prevent air from being pumped by these surfaces.

When both of the described structures are employed together, the air draft velocity from the system is reduced by at least a factor of five. For example, a shielded, counter-rotating spinner system with 10 cm. diameter spinners rotating at 20,000 RPM produces an air draft which just causes a lit match to flicker when placed 3 cm. from the spinner's edges. The shields are the most effective method for reducing air draft velocity. However, because some clearance must exist between a shield and a rotating spinner, there exists the possibility of some air recirculating within this void. The preferred embodiment, which employs counter-rotating spinners, acts to reduce these residual air drafts through the collision mechanism described above.

There are several further advantages offered by the preferred embodiment of the invention.

A. The inner surfaces of the two opposed counter-rotating spinners are self-shielded.

B. The close proximity of the spinner edges acts as an air bearing which stabilizes the spinners.

C. The close proximity of the shields with the spinners acts as air bearings which further act to stabilize the system.

D. Liquid may be introduced through either or both of the driving motor axes.

E. When the system is used with a single liquid, it may be conducted through only one motor spindle via a feed tube and sprayed equally on both spinners. Equation 2 (based on experimental results) indicates that a somewhat smaller droplet size results when a liquid flow is divided between two spinners rather than deposited on only one.

F. When the system is used with two different liquids for purposes of mixing, each liquid may be conducted by its own feed system to a respective spinner through the spindle of the motor driving that spinner. Mixing will occur outside the system, but within a relatively small volume.

G. The compact nature of the device allows it to be conveniently incorporated within a small plenum chamber.

FIGS. **5*a* and 5*b*** are graphs which compare radial air draft velocity versus spinner RPM for the prior art device and the counter-rotating conical spinner first preferred embodiment of the invention at two distances from a spinner's edge.

Figure 6:
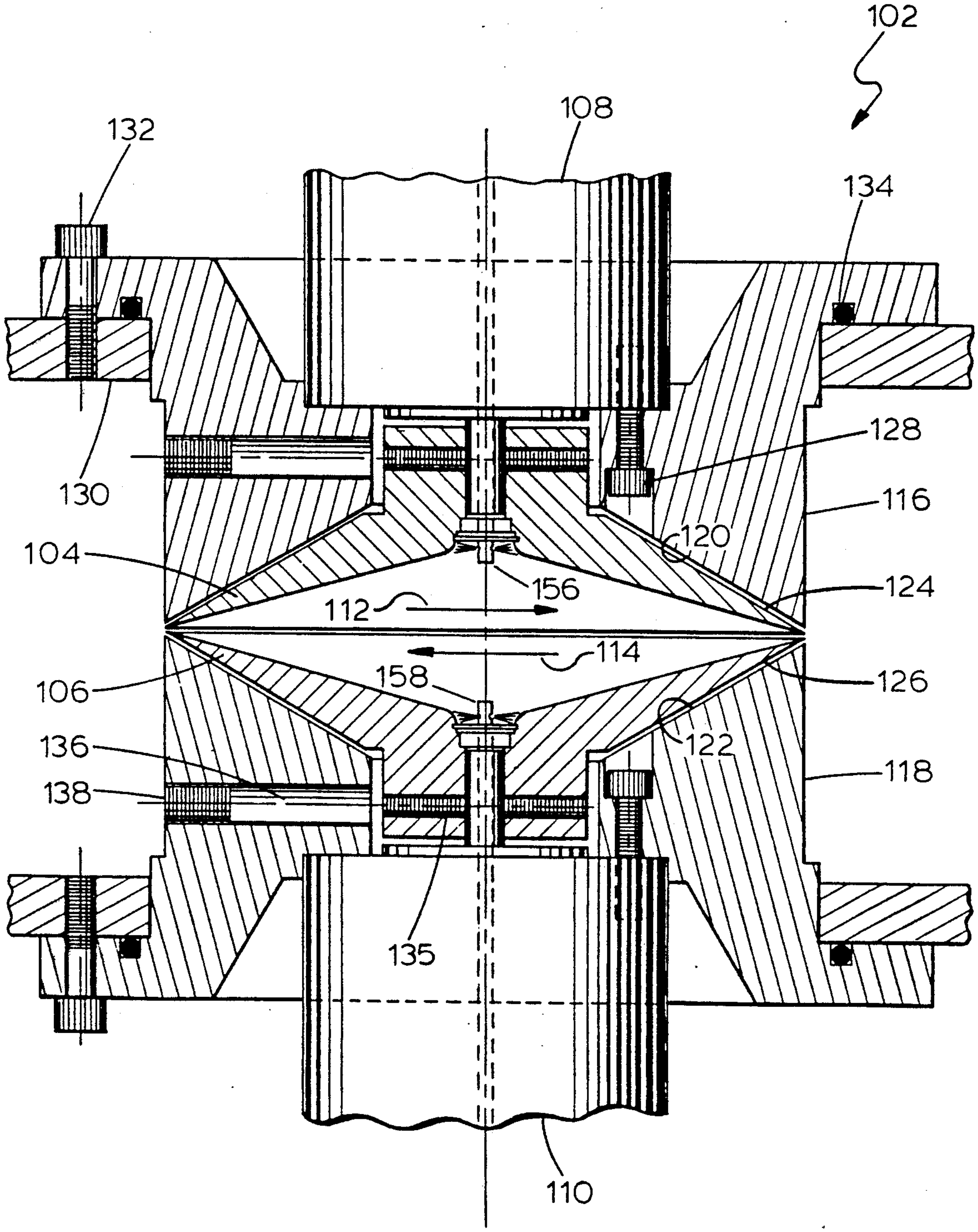

FIG. 6 is a cross-sectional view of the second preferred embodiment of the invention showing the deployment of the spinner shields and also how two liquids may be applied separately to each of the two spinners.

Figure 7:
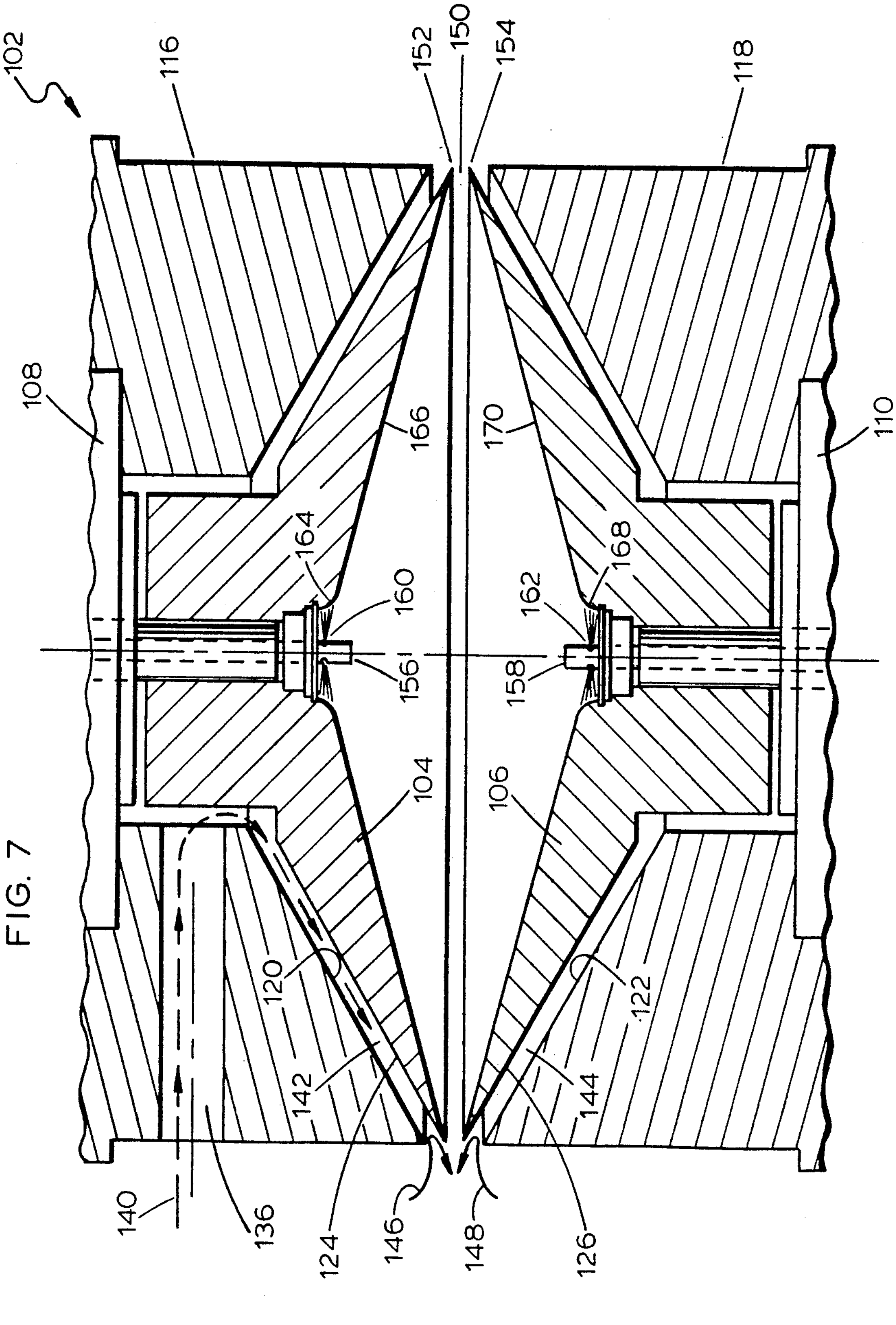

FIG. 7 is an enlargement of the spinner-shield of FIG. 6, with parts broken away, showing the fluid feed system in detail and also detailing certain aerodynamic aspects of the second preferred embodiment.

Figure 8:
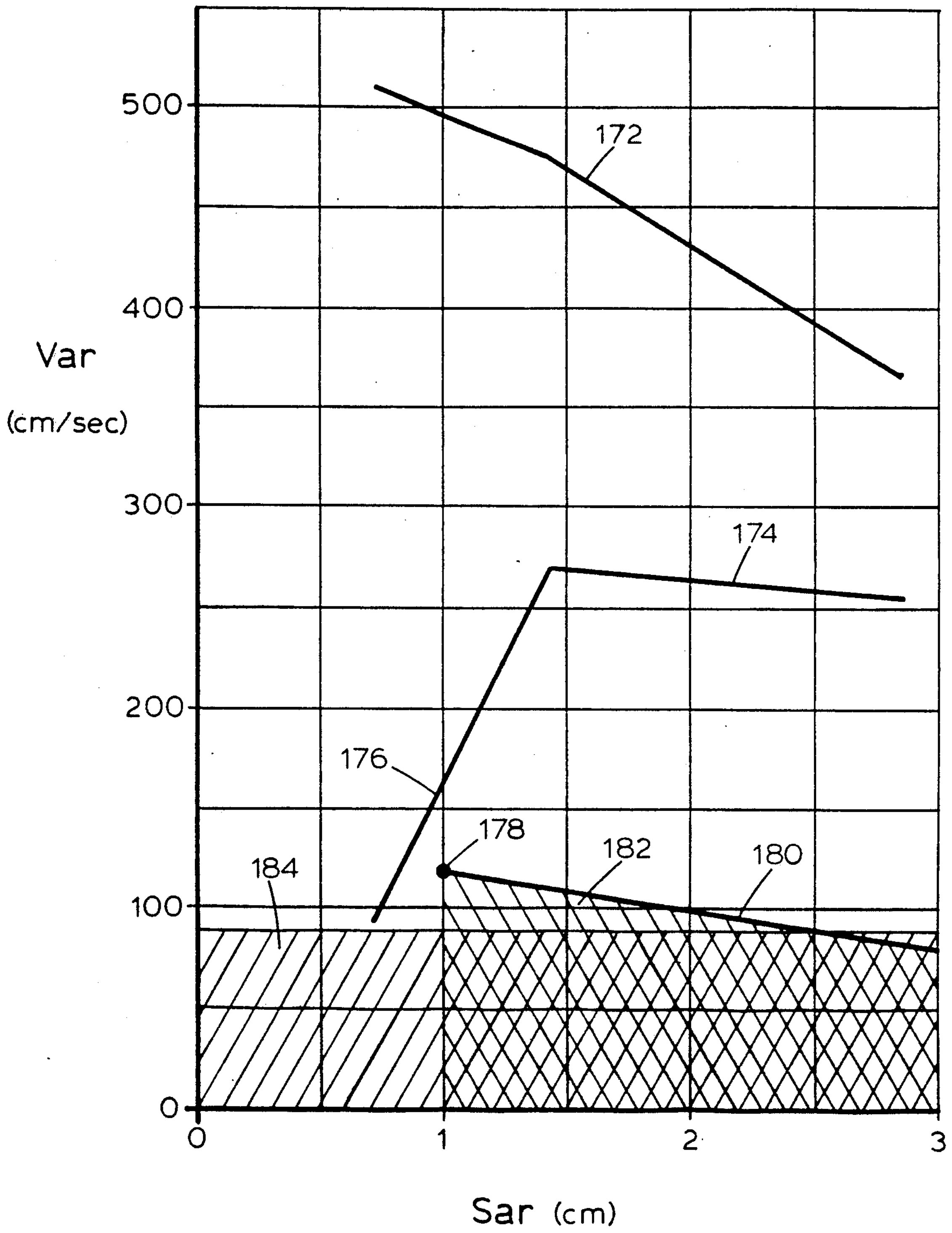

FIG. 8 is a graph which compares the performance of the prior art single spinner with that of the dual counter-rotating spinners of the first preferred embodiment and the dual counter-rotating shielded spinners of the second preferred embodiment.

Figure 9:
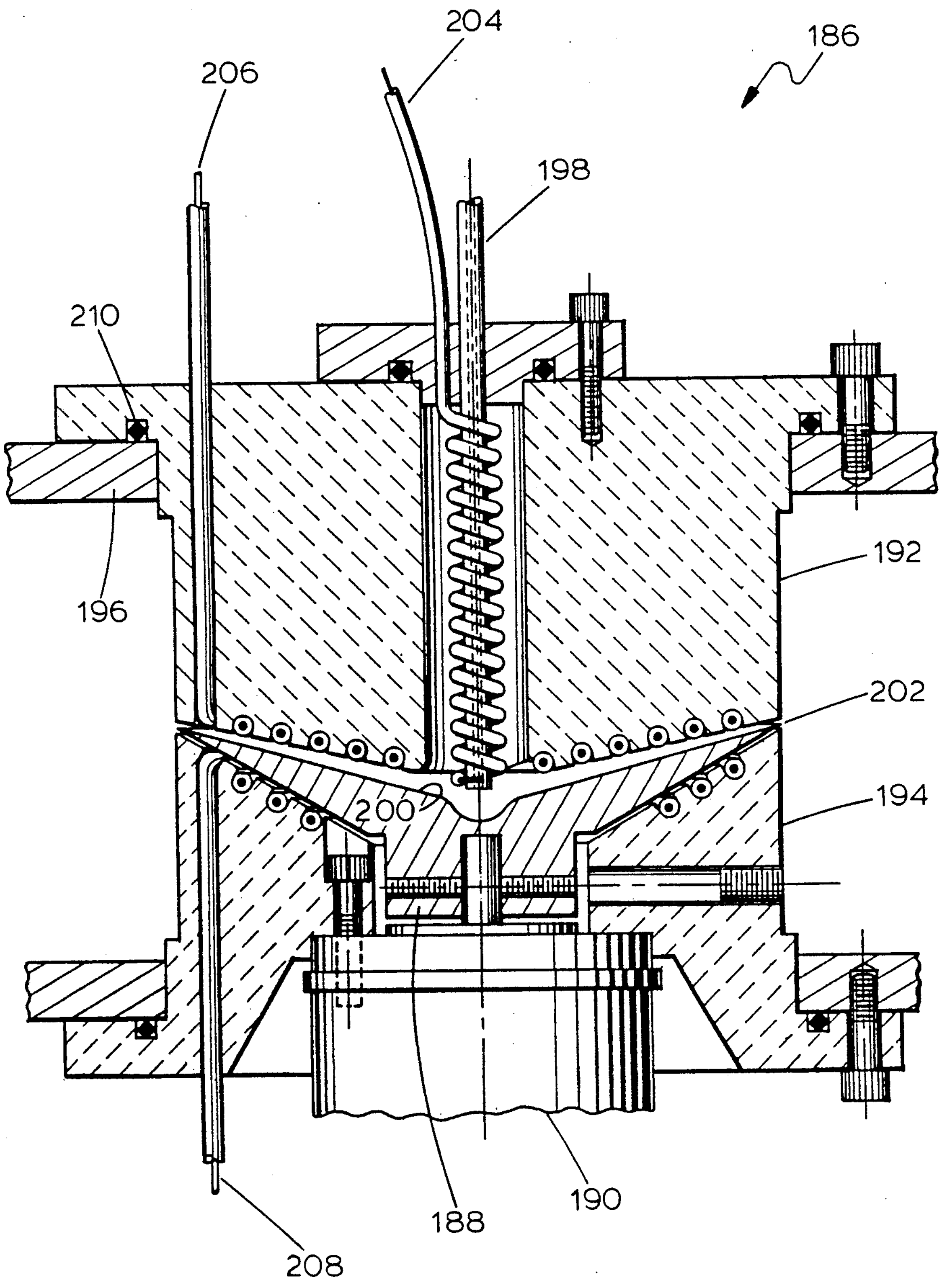

FIG. 9 is a cross-sectional view of the third preferred embodiment of the invention.

DESCRIPTION OF THE PREFERRED EMBODIMENTS

Figure 1:
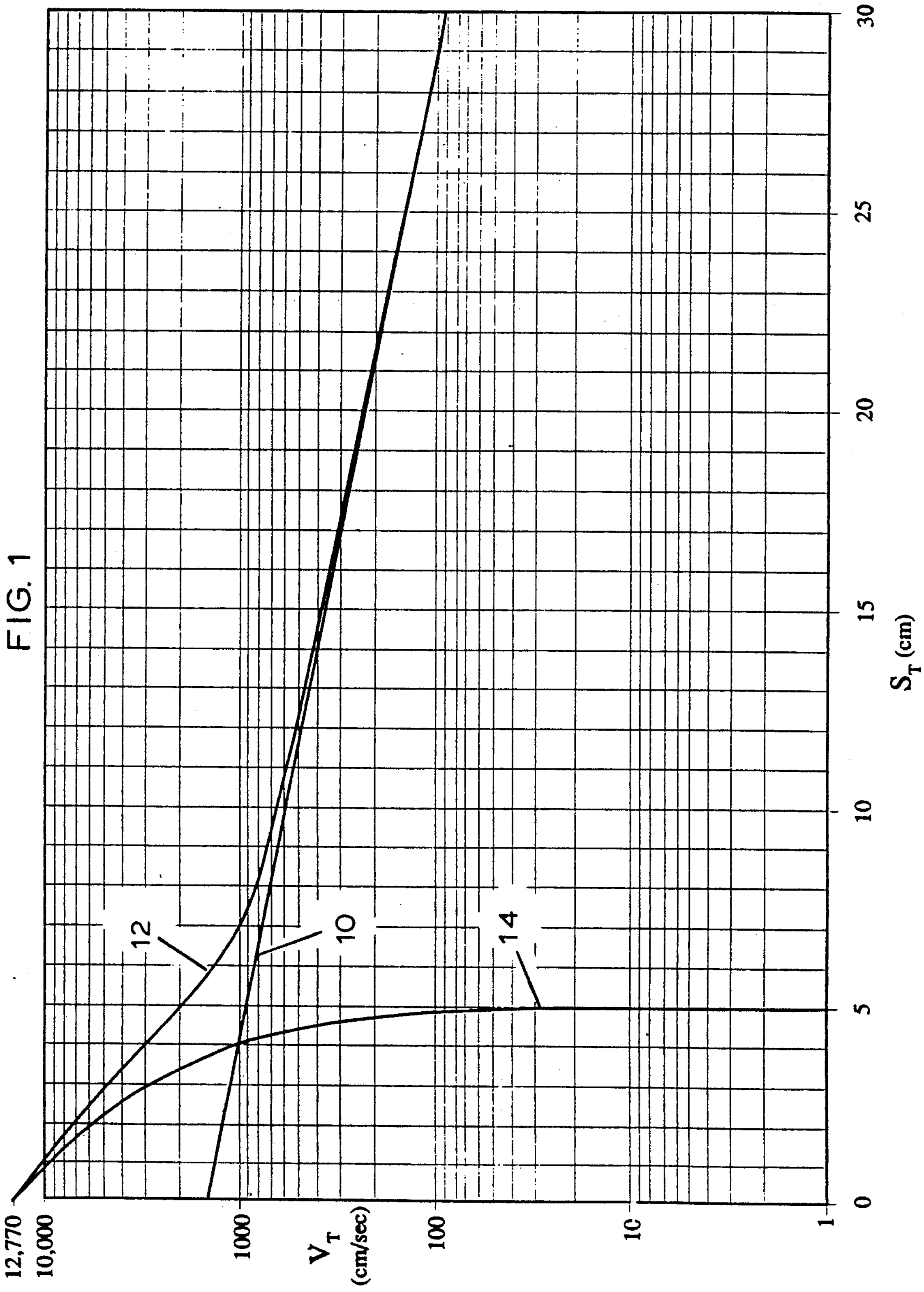
FIG. 1 is a graph which compares the performance of the prior art device with what is theoretically obtainable.

FIG. 1 compares the performance of the prior art single spinner with what is theoretically possible with regard to droplet path length. The graph relates tangential velocity $V_T$ versus tangential distance $S_T$ outward from the spinner edge for three cases of interest. The graph is based on experimental results and accepted aerodynamic principals. The experimental results were obtained using a single sharp-edged, conical, 6 inch diameter spinner rotating at 16,000 RPM where 0.75 cc/sec of paint thinner was applied to the concave side. The average droplet size produced by this system is 25 microns. Trace 10 shows the velocity-distance relationship for the typical spinner induced air draft. Trace 12 shows the velocity-distance relationship for a 25 micron droplet injected into the co-directional air draft. Trace 12 is the result of a numerical solution of an aerodynamic, differential equation, based on Equation 4, namely:

$$dV_T = [(V_{AT} - V_T)\sqrt{K_3 - K_4(V_T - V_{AT})}\,]dt \quad \text{Equa. 7}$$

Where:

$V_T$=the tangential droplet velocity.

$V_{AT}$=the tangential air draft velocity.

K3 and K4: complicated combinations of droplet density, density of air and viscosity of air (the same as in Equa. 5).

FIG. 1 shows that a droplet gradually merges with the air draft and ultimately attains the same velocity as the air draft. Trace 12 represents the performance of the prior art spinner used to microparticularize liquids. If the spinner induced air draft could be eliminated entirely, a droplet would have the theoretical velocity-distance relationship indicated by Trace 14, which is characterized by a very short path length. Trace 14 evolves from Equa. 7, except that VAT=0. When VAT=0, an exact solution can be obtained, as evidenced in Equas. 5 and 6. The present invention produces droplets with a velocity-distance relationship approaching that shown by Trace 14 because spinner induced air draft velocity is greatly reduced. It is to be appreciated, however, that trace 14 is only approachable at extremely low liquid flow rates since the ejected droplets themselves will generate an air draft due to momentum transfer.

Figure 2:
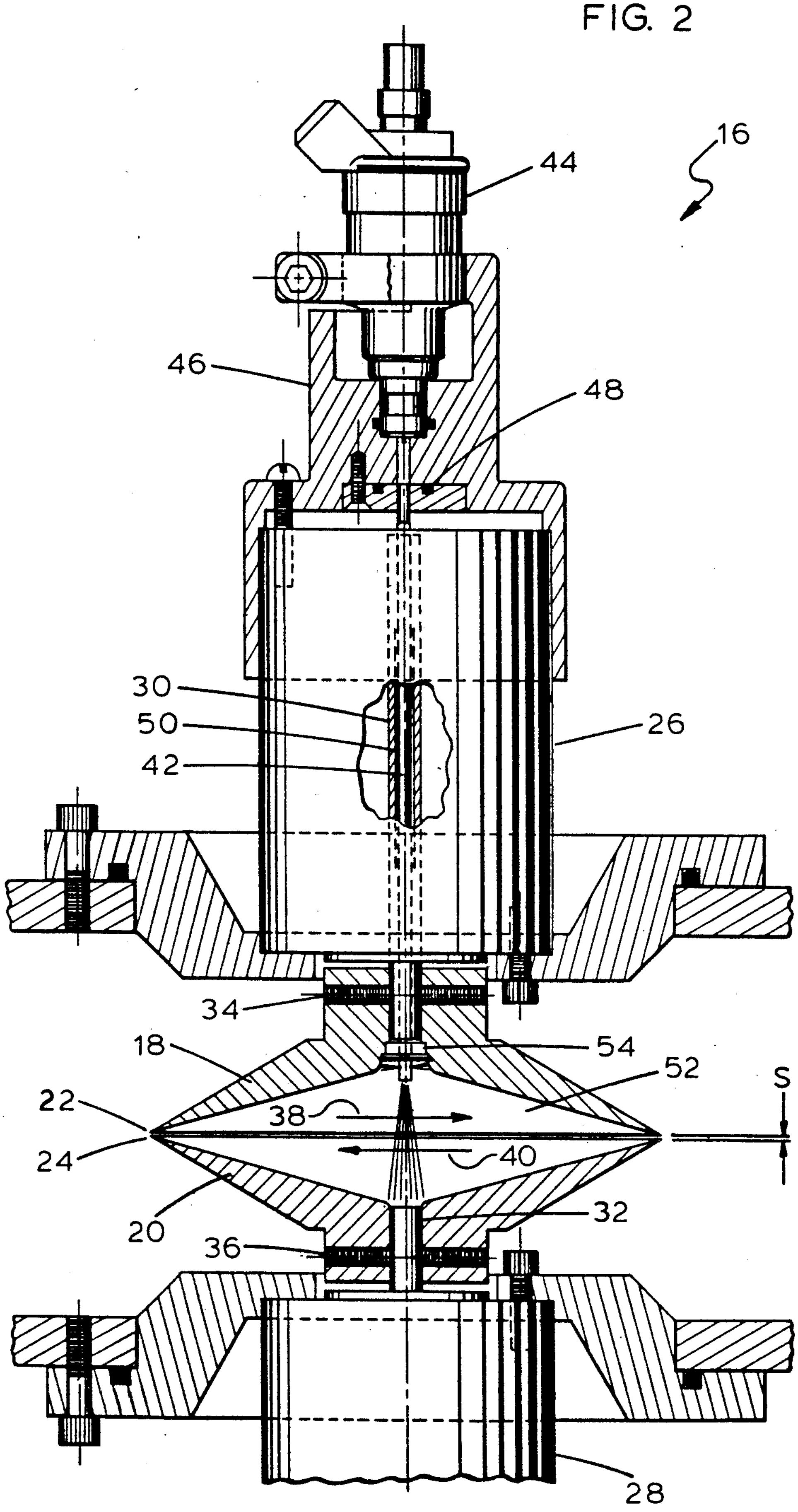
FIG. 2 is a cross-sectional view of the counter-rotating conical spinners which are the first preferred embodiment of the invention, which also shows the single-sided method of liquid feed.

FIG. 2 shows two nearly identical conical spinners 18 and 20. The spinners are coaxial with opposed, sharp edges 22 and 24. The edges are in very close proximity. In other words, dimension "S" is minimized. This is very important because the performance of the invention is degraded by increasing dimension "S". Each spinner is driven by its own motor 26 and 28 through motor shafts 30 and 32. The spinners may be fastened to their respective motor shafts by set screws 34 and 36. The motors rotate in such a way as to cause the spinners to counter-rotate, as indicated by arrows 38 and 40. Because cf the opposed positioning of the motors, both motors rotate in the same direction when each is viewed from the shaft end. This is a convenient aspect of the invention with regard to the electrical wiring of the system when electrical motors are used, or pneumatic circuitry if gas turbines are employed.

Figure 3:
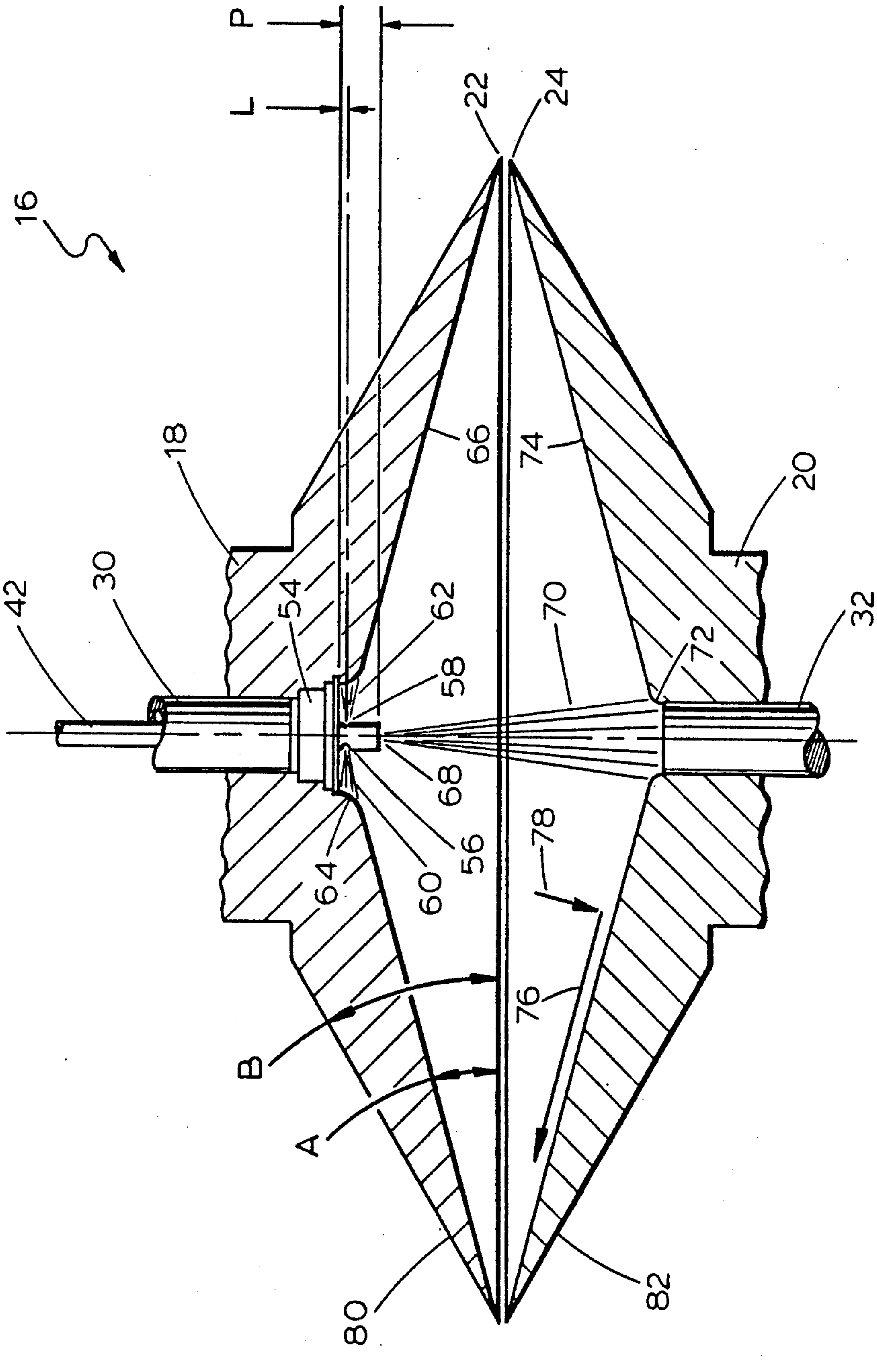
FIG. 3 is an enlargement of the spinner section of FIG. 2 showing the fluid feed system in detail and certain geometrical aspects of spinner design.
Figure 4:
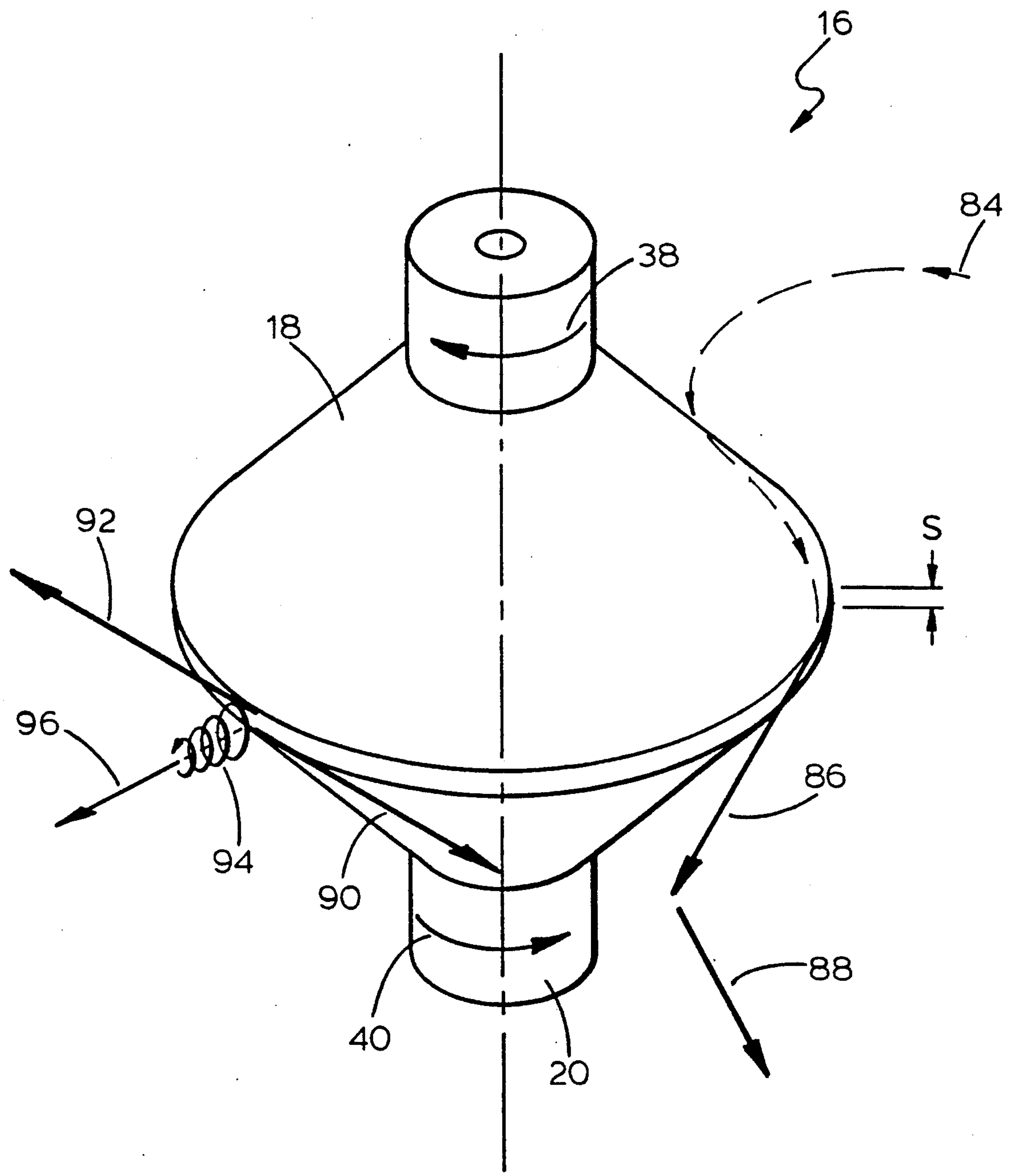
FIG. 4 is an oblique exterior view of the counter-rotating conical spinner first preferred embodiment of the invention showing how air draft velocity is reduced.

The first preferred embodiment of the counter-rotating spinner assembly for microparticalization of liquid is generally indicated at 16 in FIGS. 2, 3 and 4. In FIG. 2, the assembly is shown in substantially central vertical section, with parts broken away and parts taken in section. In FIG. 3, the assembly 16 is enlarged with respect to FIG. 2 and shows only the spinning conical spinners, their mounting shafts, and a single feed line, with parts broken away.

In FIG. 4, the assembly 16 is shown as an exterior view of the conical spinners from a front-upper oblique angle.

FIGS. 2 and 3 show the single-sided method for introducing a single liquid into the system. Such a system would be useful for automobile carbureting where gasoline is the liquid or greenhouse humidifying where water is used. Motor shaft 30 is hollow. Feed tube 42 extends from a liquid control mechanism, in this case, a modified fuel injector 44. The modification of the injector consists of grinding off the mushroom tip so that laminar fluid flow is introduced into feed tube 42. Both the feed tube 42 and injector 44 can be mounted to an adaptor 46 which can substitute for the rear motor housing. O-ring 48 seals &.he feed tube. Feed tube 42 proceeds through the hollow motor shaft 30. The clearance 50 should not be excessive so as to provide an impeded path for air traveling from the outside of the system into the void 52, which is under slight vacuum when the system operates. Air flow through clearance 50 will degrade the efficiency of the system. Feed tube 42 proceeds through bearing 54, which supports it and also offers an impediment to air flow through clearance 50.

Referring to FIG. 3, feed tube 42 is provided with side orifices 56 and 58 which are so designed as to spray half the liquid jet on surface 64 of spinner 18. Surface 64 is a curved annular recessed portion of conical surface 66 designed to capture the sprayed liquid 60 and 62 so that liquid is evenly distributed to surface 66. Feed tube 42 is also provided with an end orifice 68 which is so designed as to spray the remaining liquid as jet 70 onto the motor shaft 32 and surface 72. Surface 72 is an annular curved recessed portion of conical surface 74 designed to capture the sprayed liquid 70 so that liquid 70 is evenly distributed to surface 74. The distance between the downstream face of bearing 54 and side orifices 56 and 58 is defined by Dimension "L". Dimension "L" should be such that all the liquid 60 and 62 is sprayed onto surface 64. The amount of feed tube protrusion (Dimension "P") should be minimized to minimize feed tube vibration. Feed tube vibration can result in unequal liquid feed problems as well as fatigue cracking in the region of side jet orifices 56 and 58. The material from which spinners 18 and 20 are made must be wettable by the liquid in jets 60, 62 and 70. Otherwise, the liquid spray will not stick to surfaces 64 and 72 nor subsequently spread evenly over surfaces 66 and 74. Liquid spreads out radially on surfaces 66 and 74 through a component 76 of centrifugal force until it reaches edges 22 and 24, respectively. Angle "A" helps even out the flow since a component 78 of centrifugal force drives the liquid against the surfaces 66 and 74 causing it to spread. If Angle "A" is too small, liquid will stream directly to the spinner edges resulting in large droplets. A good range for A is 5°-15° with paint thinner. My preference is 15°. The surface finish of surfaces 66 and 74 should be matte so as to promote wetting. However, surfaces 66 and 74 should have mirror-like finishes near edges 22 and 24 so that preferential droplet emitters are not created at these edges. Edges 22 and 24 should be sharp in order to reduce the area of droplet "footprint" at the spinner's edge. The outer surfaces 80 and 82 of the two spinners 18 and 20 are defined by Angle "B". I have used 15°-30° for angle B. My preference is 30°. Angle "B" is only important in giving structural integrity to the spinners so that, at high speed, the spinners will not disintegrate or distort. The surface finishes of surfaces 80 and 82 should be mirror-like to reduce the ability of these surfaces to pump air.

FIG. 4 shows the aerodynamics of the counter-rotating spinner system. The spinners 18 and 20 are rotating, as indicated by arrows 38 and 40. Regarding spinner 18 as isolated, it will generate an air flow indicated by the dotted line 84. This is due to the adhesion of air to the outer surface of spinner 18. Due to the rotation of the spinner, the air is pumped in a radial direction along its surface. Due to the low viscosity of air, only a thin layer next to the surface attains this generalized flow pattern.

Ultimately, an air draft is formed of which an element has the velocity vector 86. Vector 86 is tangent to the spinner's edge and in the same direction as the rotation of the spinner 18. The tangential velocity vector 86 has a radial component 88.

In the case of the counter-rotating spinners, each spinner produces its own tangential air draft 90 and 92, respectively. Because the spinners are counter-rotating, the tangential velocity vectors 90 and 92 are opposed. When Dimension "S" is minimized, vectors 90 and 92 shear efficiently. Dimension "S" must be minimized because the two layers of pumped air are thin. When Dimension "S" is minimized, the point of shearing is brought close to the spinners' edges before the air drafts have a chance to disperse angularly. When Dimension "S" is minimized, vectors 90 and 92 shear and form a vortex 94, which ultimately decays into a purely radial air flow 96. Vector 96 is smaller (by about a factor of two) than vector 88, the radial component of velocity vector 86 produced by a single spinner.

Figure 5A:
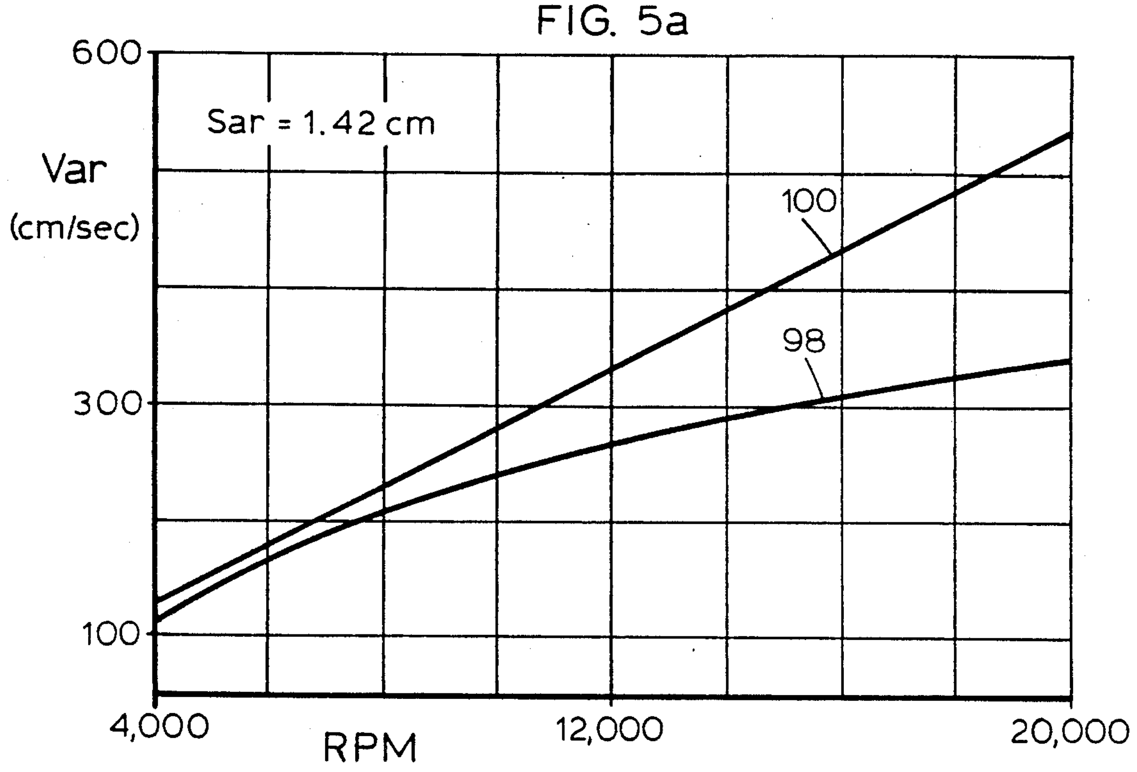
Figure 5B:
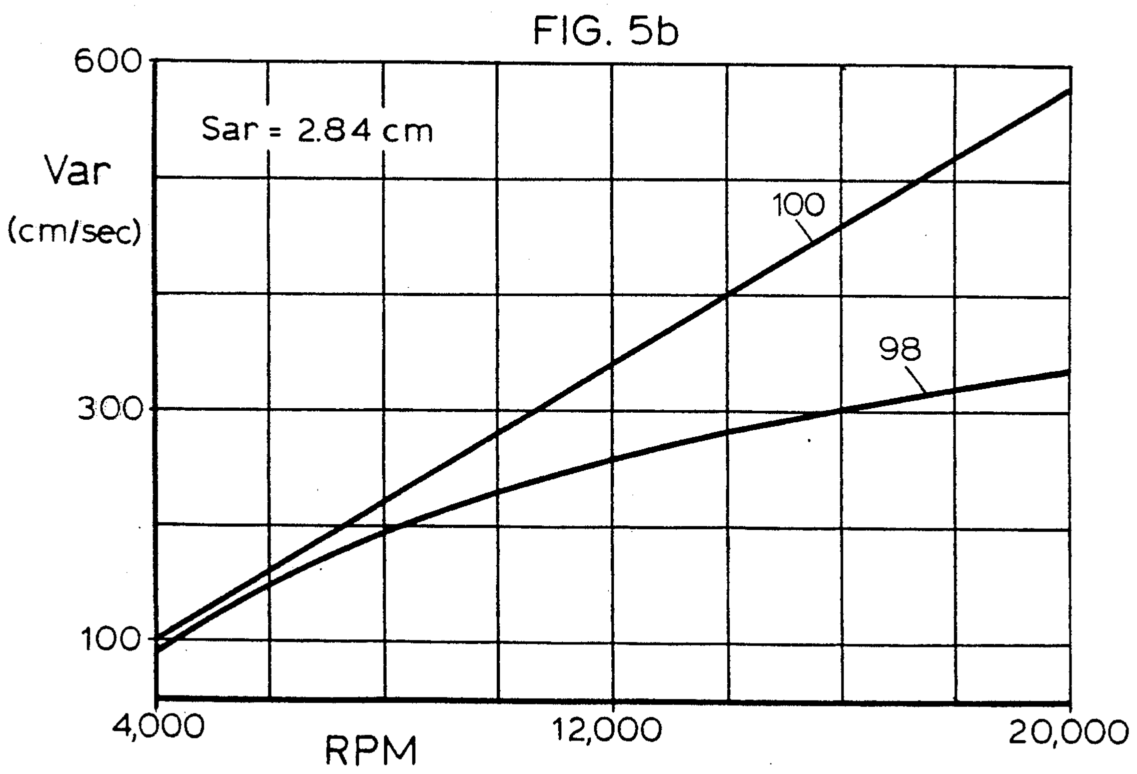

FIG. 5a compares the radial air draft velocity produced by the counter-rotating system with the radial component velocity of the air draft produced by a single prior art spinner; this, at a distance of 1.42 cm from a spinner edge. FIG. 5b does the same for a radial distance of 2.84 cm. Trace 98 indicates the performance of the counter-rotating system, whereas trace 100 indicates the performance of the single state of the air spinner. FIGS. 5a and 5b derive from real data obtained using 6 inch diameter spinners rotating at 16,000 RPM. Three observations can be made from FIGS. 5a and 5b:

A. The counter-rotating system produces a smaller radial air draft than a single spinner at any, spinner RPM or distance.

B. The radial air draft produced by the counter-rotating system increases at a lower rate with increasing spinner speed than the radial air draft component produced by the single spinner.

C. The radial air draft produced by the counter-rotating system increases at a slower rate with increasing distance from the spinner edges than the radial air draft component produced by the single spinner.

Observation B is enhanced by the fact that Equation 2 does not adequately describe the radial air draft produced by the counter-rotating system. The data for this system shows considerable curvature and is best represented by Equation 8:

$$V_{AR} = M'' \times \ln RPM - b'' \quad (8)$$

Where:

M'' and B'' are experimentally determined constants which depend on spinner geometry and the distance from the spinner's edges.

The behavior of Equation 8 (trace 98) with the increasing spinner speed shows the enhanced behavior of the counter-rotating system over the single spinner, which is best represented by Equation 2 (trace 100).

Besides reducing the radial air flow velocity by a factor of two, the counter-rotating system produces a purely radial air flow. Referring back to FIG. 4, vector 86, besides representing the tangential trajectory of air flow from a single spinner, if the spinner 18 was isolated, can also represent the tangential trajectory of a droplet emitted from a single spinner. In other words, in the case of a single spinner, the induced air draft vector and droplet trajectory are codirectional. In the case of the counter-rotating system, the droplets initially have tangential trajectories like vectors 90 and 92. However, the air flow is purely radial as vector 96. A consequence of this is that the tangentially traveling droplets run into the radial air flow. This vector collision slows the droplets dramatically and curves their trajectories in a radial direction. Still, the droplets are ultimately entrained by the radial air draft produced by the counter-rotating system.

The second preferred embodiment of the counter-rotating spinner assembly for microparticalization of liquid is generally indicated at 102 in FIGS. 6 and 7. The apparatus 102 employs the closely spaced counter-rotating spinners of the first embodiment together with shields to control air flow on the outer surfaces of the spinners. In addition, FIGS. 6 and 7 also show how two liquids may be introduced separately into the system for mixing beyond the spinner edges.

FIG. 6 shows two opposed conical spinners 104 and 106, driven by motors 108 and 110 in a counter-rotating manner, as indicated by arrows 112 and 114. These counter-rotating spinners are identical to the first preferred embodiment 16 for reducing spinner-induced air draft velocity described earlier. All that was said previously about the prior spinners 18 and 20 also applies to the spinners 104 and 106.

In addition, FIGS. 6 and 7 show the use of non-rotating shields 116 and 118. The shields have surfaces 120 and 122 which are in very close proximity with the surfaces 124 and 126 of the rotating spinners 104 and 106. The shields prevent air from reaching spinner surfaces 124 and 126. Consequently, no air flow can be induced by these surfaces. Shields 116 and 118 present the second preferred embodiment for greatly reducing spinner-induced air drafts. Shields 116 and 118 may also serve for mounting the respective spinner driving motors 108 and 110 via bolts 128. Also, shields 116 and 118 may serve as adaptor flanges to hold the two motor-spinner subassemblies to a plenum chamber 130 via bolts 132 and O-rings 134. Access to the spinner set screws 135 may be made through access holes 136. Access holes 136 are plugged by set screws 138.

Whatever the design configuration, a prime prerequisite is to make a leak-tight assembly so that air cannot reach spinner surfaces 124 and 126. Referring to FIG. 7, access hole 136 must be plugged, otherwise an air flow will be created along the path indicated by the dotted arrow 140, which will partially destroy the action of shield 116. When leak-tight, the shields are extremely effective in eliminating spinner-induced air drafts. However, because of the finite clearances 142 and 144 and the fact that a slight vacuum exists within these clearances, a very small recirculation of air will occur near each spinner edge, as indicated by arrows 146 and 148. However, the action of the counter-rotating spinners (described above) tends to nullify this. Clearances 142 and 144 also act as air bearings, as does clearance 150 between the spinner edges 152 and 154. The air bearings greatly reduce spinner vibration and, consequently, improve the stability of the spinner edges. This results in more uniform droplet diameters. It is to be emphasized that the performance of the system is optimized by minimizing clearances 142, 144 and 150. A practical value for these clearances may be taken as 0.015 inch.

The apparatus shown in FIGS. 6 and 7 can employ two like feed tubes 156 and 158. In this instance, each feed tube has only side jet orifices 160 and 162, respectively. Such a system can be used for mixing two different liquids. One liquid may be introduced through feed tube 156 where it is sprayed onto spinner surface 164 where, in turn, it will spread over spinner surface 166 to spinner edge 152 where it is emitted as droplets. Likewise, the other liquid may be introduced through feed tube 158, sprayed on curved annular surface 168 where it proceeds to spread over surface 170 and ultimately reaches spinner edge 154 where it too is emitted as droplets. Mixing of the two liquids in droplet form occurs in a relatively small volume adjacent to, but just beyond the spinner edges. Mixing is efficient because of the greatly enhanced density of the fog of particles brought about by the nearly total elimination of spinner induced air drafts. Each fluid system may be provided with flow controls so that the proportion of the mixture can be easily adjusted. The mixing can be done in a controlled inert atmosphere introduced directly into the plenum chamber. The atmosphere into which the binary liquid chemicals are released can in itself be a reactant.

FIG. 8 compares the performance of the prior art single spinner with that of the dual counter-rotating spinners and the dual counter-rotating shielded spinners. The data is from actual experiments involving 3.950 inches diameter, conical, sharp-edged spinners, all of the same geometry, rotating at 20,000 RPM. Trace 172 shows the radial air draft component velocity versus distance relationship for the prior art spinner. Trace 174–176 shows the radial air draft velocity versus distance relationship for the dual counter-rotating spinners. Segment 176 pitches downward to the left because of the vortex mentioned earlier. The reduction in air draft velocity through the employment of counter-rotating spinners alone is readily evident over the range shown. At greater distances, the reduction improves. Attempts at measuring the radial air draft velocity produced by the dual counter-rotating shielded spinners were hampered by the fact that the instrumentation could only measure air draft velocities greater than 89 cm/sec. The cross-hatched area 184 shows where measurements were not obtainable. Data point 178 shows the only reliable value obtained with this system. No air draft velocity could be detected at 2.5 cm. Consequently, trace 180 indicates the worst case behavior of the dual counter-rotating shielded spinners. The opposite cross-hatched area 182 indicates where the characteristic curve for this system may lie. Considering the only data point available, a five-fold improvement has been made over the single spinner.

The third preferred embodiment of the shielded spinner assembly for microparticalization of liquid is illustrated in section in FIG. 9 and is generally indicated at 186. The apparatus 186 is useful in material processing where the manufacture of spherical microparticles of a particular material is desired. The principal advantage of the invention in this regard would be to reduce trajectory lengths brought about by the near elimination of air drafts so that the manufacturing process could be conducted in a smaller volume. In this case, it is convenient to have one spinner 188 driven by motor 190. Spinner 188 is almost the same configuration as spinners 20 and 106. Two non-rotating shields 192 and 194 act to greatly reduce the generation of spinner induced air drafts. Shields 192 and 194 may also serve as mounting flanges for both mounting the spinner motor 190 and mounting the shields to the plenum chamber walls 196. The material to be processed is introduced in liquid form through feed tube 198 and deposited on spinner surface 200 where it wets and spreads under a component of centrifugal force across the conical spinner surface to edge 202 where it is emitted as droplets.

If heat is required, heater coils 204, 206 and 208 may be employed to heat the feed tube 198, the shields 192 and 194, and spinner 188 by conduction or radiation. If heat is involved, it may be convenient to use metal "V" seals 210. Shields 192 and 194 may be made of ceramic. The spinner 188 may be made of a wettable refractory metal or ceramic. An inert, refrigerated gas may be used as an atmosphere within the plenum chamber to promote cooling.

By this structure and by the previous structures, microparticalization of liquids can be achieved. One or two such liquids can be microparticalized and discharged into a controlled gaseous environment for reaction. The apparatus of FIG. 9 also shows that the temperature of the microparticalized liquid can be controlled by heating. Similarly, it can be cooled, in accordance with the requirements of a particular reaction.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An apparatus for the microparticalization of liquids comprising:

first and second conical spinners each having the same axis;

means for counter-rotating said first and second conical spinners about said axis, each said first and second conical spinner having a concave face concentric about said axis and each said conical spinner having a convex face concentric about said axis, said faces meeting in a sharp spinner edge which is concentric about said axis, said sharp spinner edges of said first and second conical spinners being sufficiently close to form a gas bearing therebetween;

means for delivering liquid to at least one of said concave faces so that upon rotation of said conical spinners, liquid moves radially outward on said concave faces to said edges of said first and second conical spinners where it is thrown from said conical spinners in microparticles; and first and second non-rotating shields respectively positioned closely adjacent said convex surfaces of said first and second conical spinners for minimizing generation of gas flow in the gas around said conical spinner.

2. The apparatus of claim 1 wherein said concave faces of said first and second conical spinners are substantially conical about said axis.

3. The apparatus of claim 2 wherein said convex surfaces of said first and second conical spinners are substantially conical about said axis.

4. The apparatus of claim 1 wherein said means for counter-rotating said first and second conical spinners comprises first and second motors respectively connected to said first and second conical spinners and said means for delivering liquid to at least one of said concave faces comprises a liquid feed tube passing axially through one of said motors.

5. The apparatus of claim 4 wherein said means for delivering liquid to at least one of said concave faces further includes side jets directed toward said concave side of said first conical spinner and an end jet directed to spray liquid onto said second conical spinner.

6. An apparatus for the microparticalization of liquid in gas comprising:

a first spinner having an axis, means for rotating said first spinner about said axis, said first spinner having a concave surface and a back surface, both said concave surface and said back surface being surfaces of revolution about said axis, said surfaces meeting in a sharp edge which is concentric about said axis;

a second spinner having an axis, means for rotating said second spinner about said axis in the opposite rotary direction from the rotation of said first spinner about said axis, said second spinner having a concave surface and a back surface, both said concave surface and said back surface being surfaces of revolution about said axis, said surfaces meeting in a sharp edge which is concentric about said axis;

means for supplying liquid to said concave face of at least one of said first and second spinners so that when said spinners are rotating, liquid moves across said concave surface of said one of said spinners and off said sharp edge of said one of said spinners to microparticalize in the surrounding gas; and a first stationary shield lying directly adjacent said back surface of said first spinner and a second stationary shield lying directly adjacent said back surface of said second spinner for minimizing gas flow resulting from friction against said back surfaces.

7. The apparatus of claim 6 wherein each said shield lies sufficiently close to its respective surface so as to form a gas bearing with respect thereto.

8. The apparatus of claim 7 wherein at least one of said shields is heated.

9. The apparatus of claim 6 wherein a plenum surrounds said spinners to define a plenum chamber and the gases within said plenum chamber.

10. An assembly for microparticalization of liquid, comprising:

first and second spinners, an axis, said first and second spinners being rotatable about the same axis, said first and second spinners respectively having first and second concave surfaces which are surfaces of revolution about said axis, said first and second concave surfaces facing each other, said first and second spinners respectively having first and second back surfaces which are surfaces of revolution around said axis, said first concave and back surfaces intersecting each other and said second concave and back surfaces intersecting each other to respectively form first and second circular sharp edges on said first and second spinners, said first and second sharp edges lying close to each other so that air drafts generated by said back surfaces effectively shear together to substantially reduce air draft outward from said edges;

means connected to said first and second spinners to drive said first and second spinners in opposite directions around said axis so that gas flow due to frictional drag against said concave surfaces is substantially neutralized;

first and second shields, said first and second shields being stationary and being respectively positioned adjacent said back surfaces of said first and second spinners; and means to deliver liquid to said concave surfaces so that upon delivery of liquid and rotation of said spinners, microparticalized liquid is discharged from said edges into the surrounding space.

11. The apparatus of claim 10 wherein said means to deliver liquid comprises means to deliver a separate liquid to each of said concave surfaces so that different microparticalized liquids are discharged adjacent each other at said first and second circular sharp edges.

12. The apparatus of claim 11 wherein said concave surfaces are substantially conical about said axis.

13. The apparatus cf claim 11 further including a plenum defining a chamber around said spinners so that the gas within said plenum chamber can be controlled.

* * * * *